(No Model.) 2 Sheets—Sheet 1.
W. M. TERRIBERRY.
ORNAMENTAL MOLDING AND METHOD OF MAKING SAME.
No. 534,055. Patented Feb. 12, 1895.
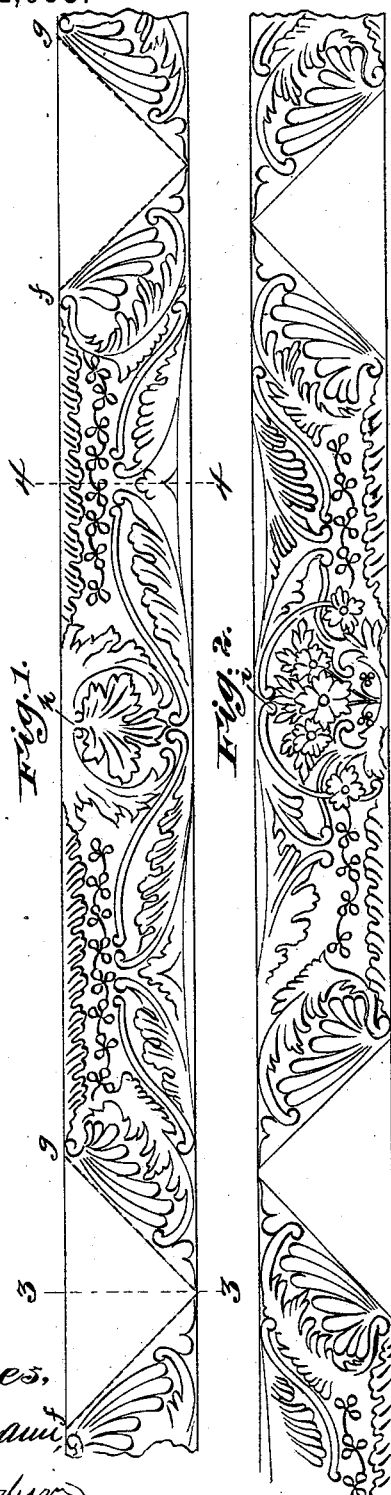
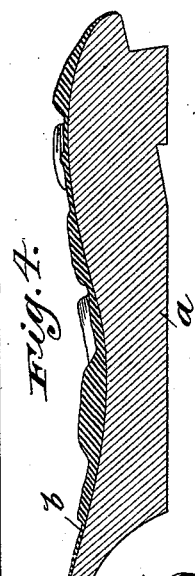
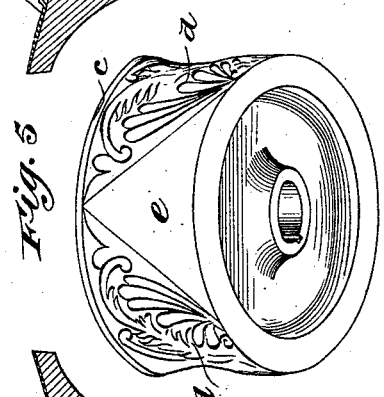
Witnesses,
Inventor,
William M. Terriberry
Offield, Towle & Linthicum
Atty's.

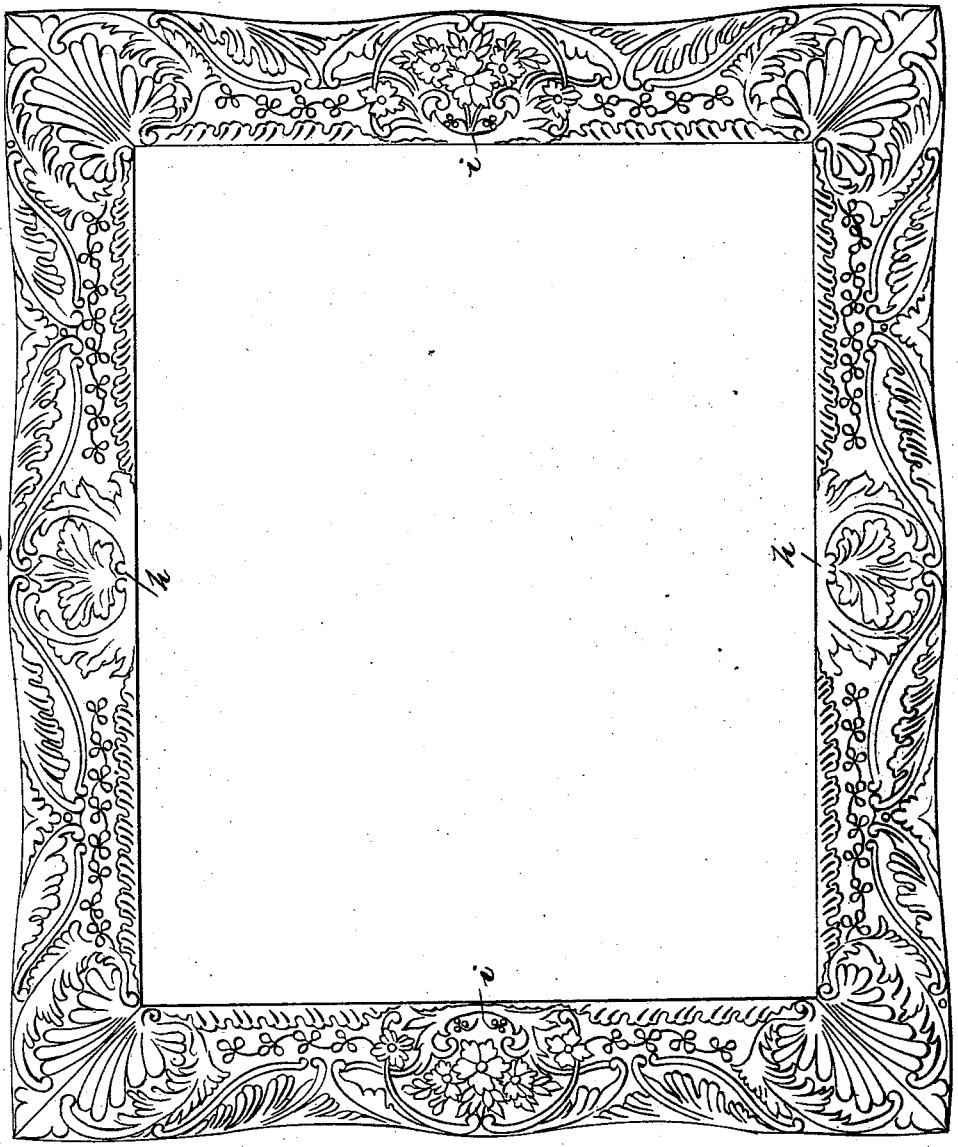

UNITED STATES PATENT OFFICE.

WILLIAM M. TERRIBERRY, OF CHICAGO, ILLINOIS.

ORNAMENTAL MOLDING AND METHOD OF MAKING SAME.

SPECIFICATION forming part of Letters Patent No. 534,055, dated February 12, 1895.

Application filed November 5, 1894. Serial No. 527,901. (No model.)

*To all whom it may concern:*

Be it known that I, WILLIAM M. TERRIBERRY, of Chicago, Illinois, have invented certain new and useful Improvements in Ornamental Molding and Methods of Making the Same, of which the following is a specification.

This invention relates to that class of moldings in which a base or strip ten to sixteen feet in length is covered with a plastic composition laid thereon by rollers engraved with a design, which moldings are afterward cut up into suitable lengths and framed together to produce picture frames. Heretofore in the manufacture of such moldings it has been common to apply the plastic material to the base by means of the figured roller which imparted a design of a length corresponding to the circumference of the roller, the design being repeated two or more times on the same strip. Picture frames are usually made up by cutting four pieces of molding to the desired length and framing them together with miter joints at the corners, the frame being usually rectangular. By this method no provision was usually made for matching two portions of a design together at the miter joints, the practice being to cut the molding to the required length and without reference to the design and then to employ corner pieces covering the miter joints and bearing portions of a design having some relation to the design of the frame pieces. When the corners are thus made it gives a patch-work appearance to the frame, and often the unitary effect of the design is destroyed. If any attempt be made to match the several portions of the design it results usually in great waste in cutting up the molding. It has also been common to roll a strip of composition with an engraved roller so as to produce a design thereon upon a strip of zinc or other metal, and then transfer said plastic strip to the wooden base. By this method the plastic mass is stretched or compressed in order to preserve, as far as possible, unity of the design at the corners of the molding. Obviously this method is very objectionable because the unity of the design is destroyed by this shortening or lengthening process. To overcome these various objections and to produce a composition picture molding rapidly and with the designs so arranged thereon that the molding can be cut up and framed without waste while preserving the integrity or unity of the design itself is, therefore, the principal object of my invention.

In carrying out my invention I preferably make use of an engraved roller or cylindrical die, which is distinguished from other rollers or dies of like character only in that, instead of covering the whole circumference of the roller with the design, I permit the extremities of the design, as they may be termed, to meet only at one side or edge of the roller, leaving a triangular space whose radius is transverse to the circumference of the roller, and then pass strips of molding of any desired length beneath this roller or die and lay thereon by means of the die a composition which will receive a succession of similar designs with intermediate blank spaces of triangular form separating them. The picture molding thus produced can be cut or mitered so that two portions of the design can be perfectly matched at the corners. Ordinarily, however, frames are made oblong instead of square, and therefore in producing the material for a picture frame the side pieces will have a design slightly varying from the end pieces, but whether the designs be identical or slightly varied, the same method is employed in producing them, and the moldings themselves are substantially identical as articles of manufacture.

In the accompanying drawings, Figures 1 and 2 show in plan, broken sections of picture molding embodying my invention. Figs. 3 and 4 show cross sections on lines 3—3 and 4—4. Fig. 5 shows in perspective view an engraved roller or die; and Fig. 6 shows a frame made up with the molding of my invention.

In the drawings, *a*— represents the base or strip of molding, usually of wood, and which is most conveniently worked in lengths of ten, twelve, fourteen or sixteen feet, and of any desired form in cross section. One surface of this base strip is coated or covered with a layer —*b*— of plastic material, the composition of which is well understood. This plastic material is most conveniently applied by means of a rotary die —*c*— having a design —*d*— engraved thereon, except that a triangular space —*e*— is left plain. The two adjacent portions or extremities of the designs have such relation to each other that when the blank portion of the molding is cut out—as for example on the dotted lines —*f*— *g*— (Figs. 1 and 2) said portions of the design will meet and complete at the corners or joints a perfect figure.

The design shown in Fig. 1 is longer than that shown in Fig. 2 and slightly varies therefrom as to the central figures —*h*—*i*— and a frame made up of strips bearing the designs shown in said figures is represented in Fig. 6, where the molding shown in Fig. 1 is employed for the vertical sides of the frame, while the molding shown in Fig. 2 is employed for the end pieces thereof. Now it will be seen that if the blank space was covered by a portion of the design, or in other words, if the design were continuous, as in the common practice, and the moldings were mitered together to form the frame, a portion of the design would be removed and the unity destroyed. To remedy this the common practice is to apply a corner piece as above mentioned.

In order to make the parts of the design match as nearly as possible, the molding will be cut at such point as would the most nearly secure matching of the parts of the design, and to do this frequently considerable portion of the molding is wasted. By my improvements, however, there is no waste except of the material necessary to be removed in forming the miter joint. The parts of the design match perfectly at the corners, and the use of corner pieces is dispensed with, while a frame vastly superior in appearance and durability is secured at less cost.

Of course the design may be varied at will and the several parts may be joined together to make frames of different shapes than here shown. Obviously, also, the design might be impressed in the plastic composition or layer by other means than a rotary die, although I prefer to use such die and the latter, so far as I am aware, is new and of my own invention, but is not claimed in this application.

What I claim as new, and desire to secure by Letters Patent, is—

1. A picture molding having a design thereon with its end portions formed on an angle to its width whereby it is adapted when the molding is severed on said angular lines to be joined to a complementary part to produce a unitary design, substantially as described.

2. A picture molding having a design repeated thereon with substantially triangular spaces intermediate the sections and by the removal of which portions the parts of the design may be harmoniously joined at the corners of a frame, substantially as and for the purpose described.

3. The herein-described method of making molding for picture frames, which consists in applying a continuous coating of plastic material to a suitable base strip by means of a roller or die and simultaneously impressing in said plastic material a series of similar sections of a design, each section terminating in a portion adapted when severed by diagonal cuts to be joined to another portion to form a completed corner, substantially as described.

WILLIAM M. TERRIBERRY.

Witnesses:
C. C. LINTHICUM,
JEROME W. MILLINGTON.